Figure 1:
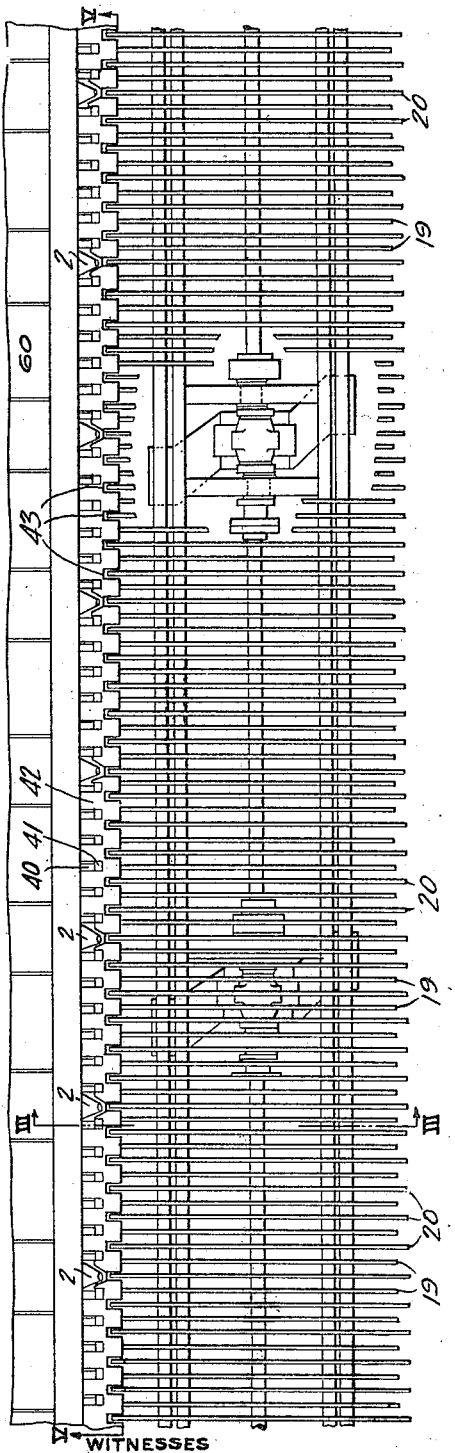

H. D. WILLIAMS & W. AHLEN.
BAR HANDLING APPARATUS.
APPLICATION FILED MAR. 29, 1915.

1,155,118.   Patented Sept. 28, 1915.
7 SHEETS—SHEET 1.

INVENTORS
H. D. Williams
Wm Ahlen
by C. C. Leuthieum
their Attorney

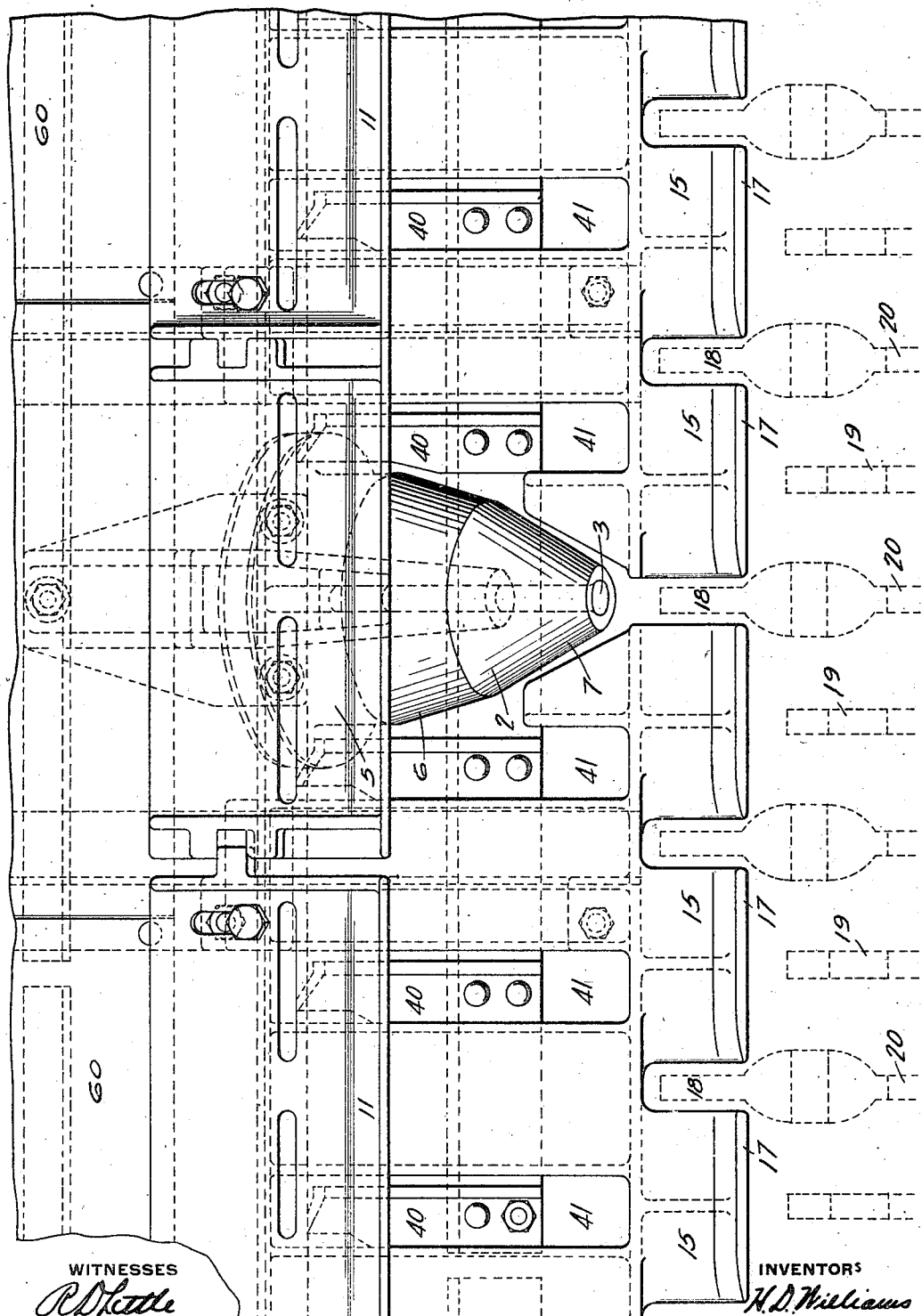

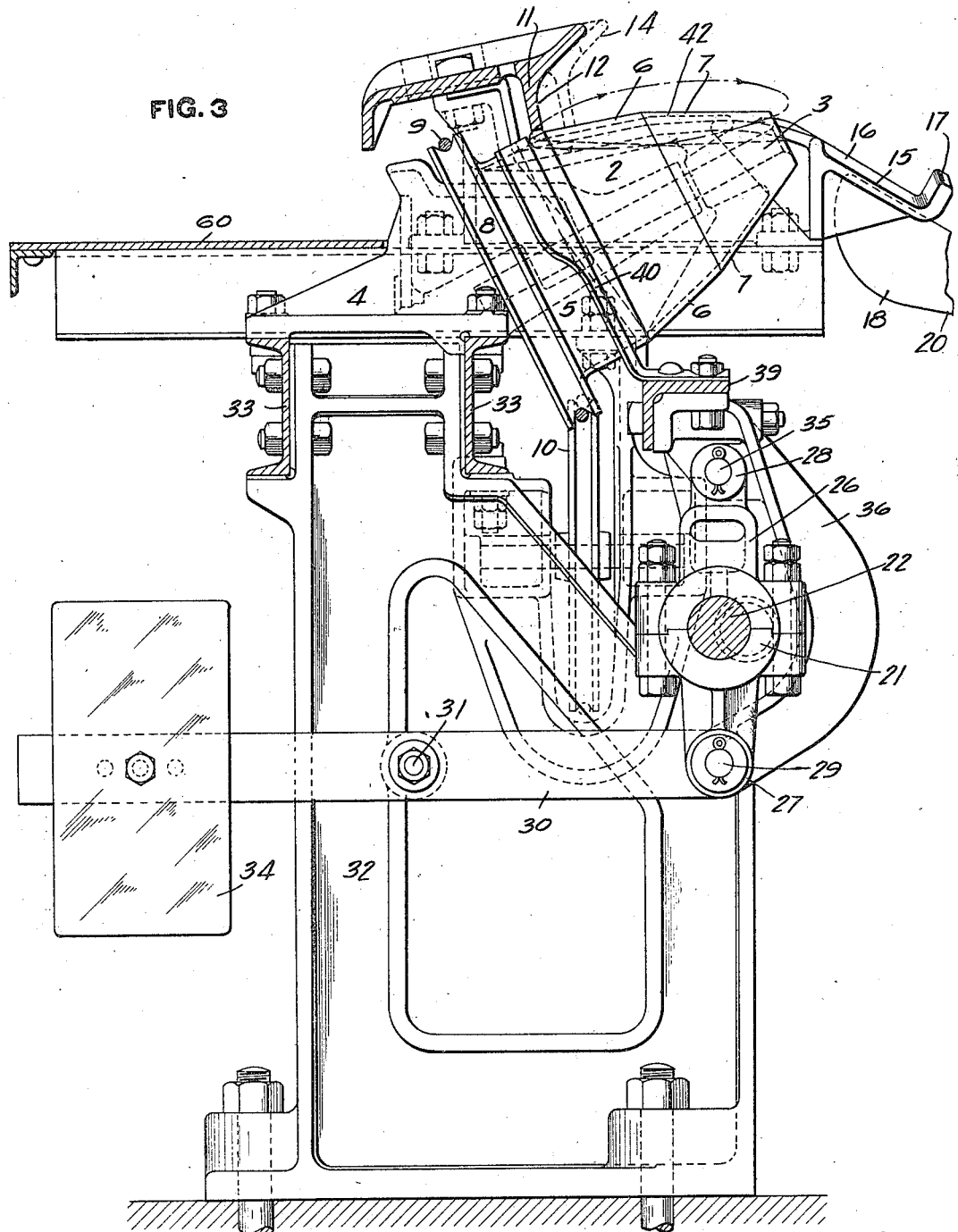

H. D. WILLIAMS & W. AHLEN.
BAR HANDLING APPARATUS.
APPLICATION FILED MAR. 29, 1915.
1,155,118.
Patented Sept. 28, 1915.
7 SHEETS—SHEET 4.
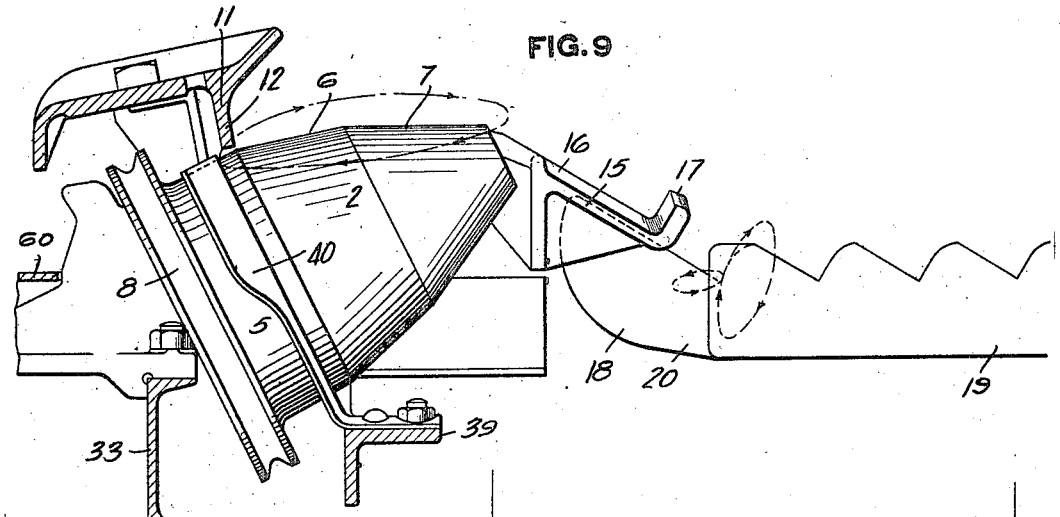
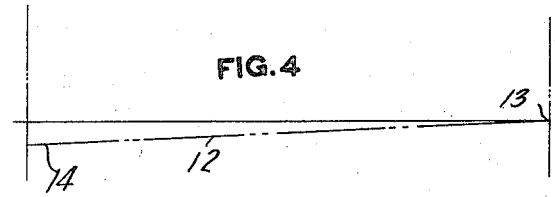
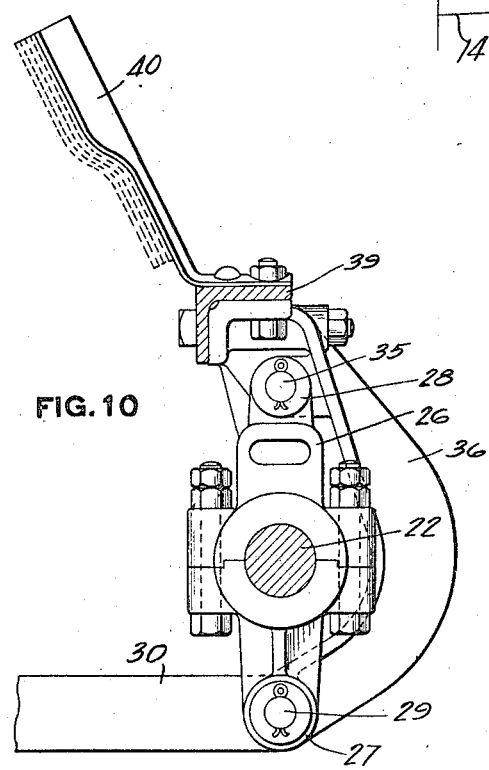
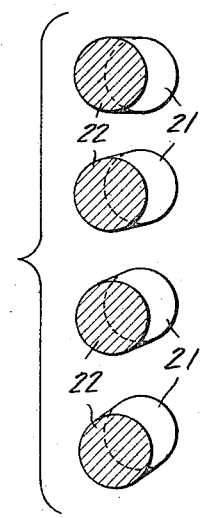

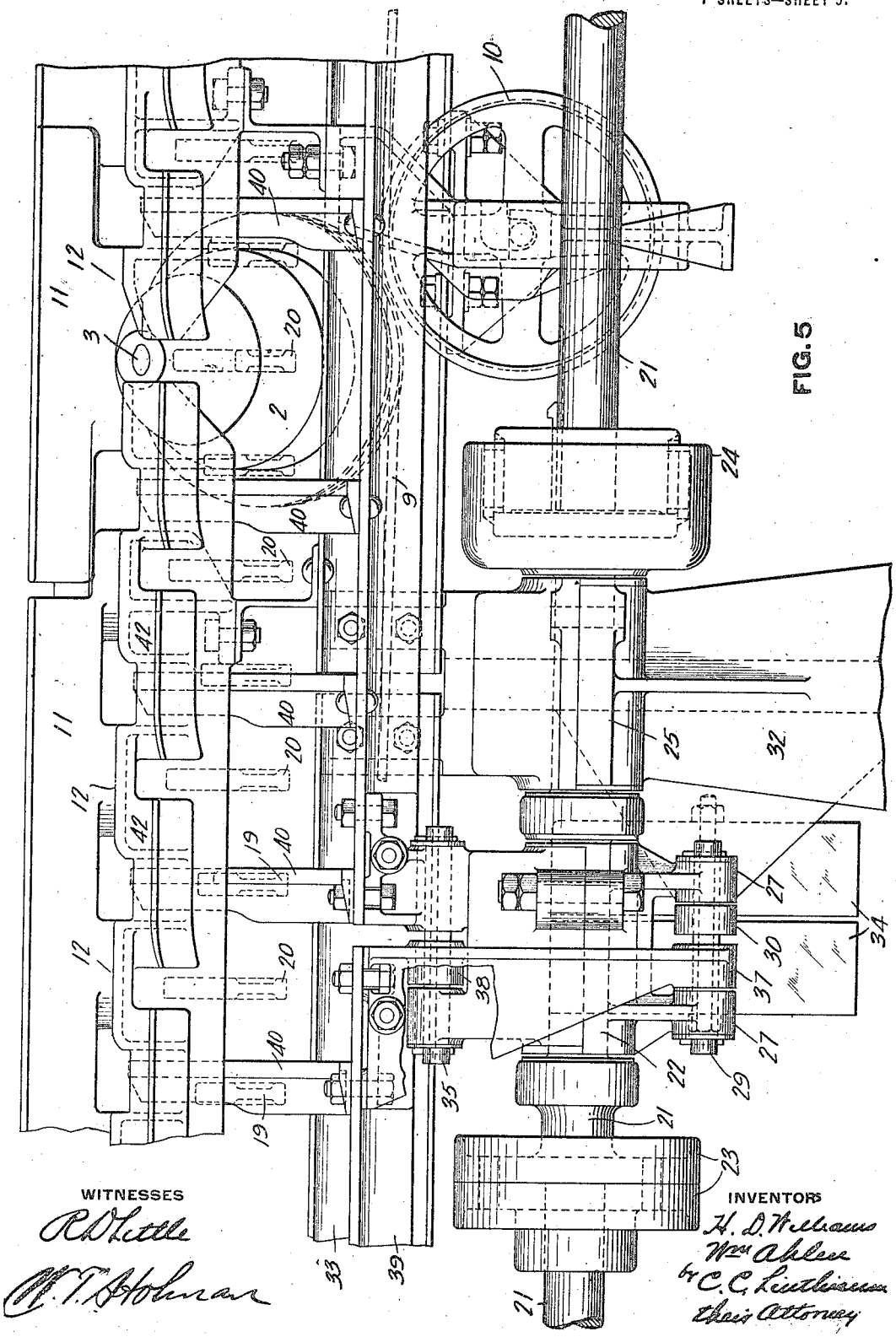

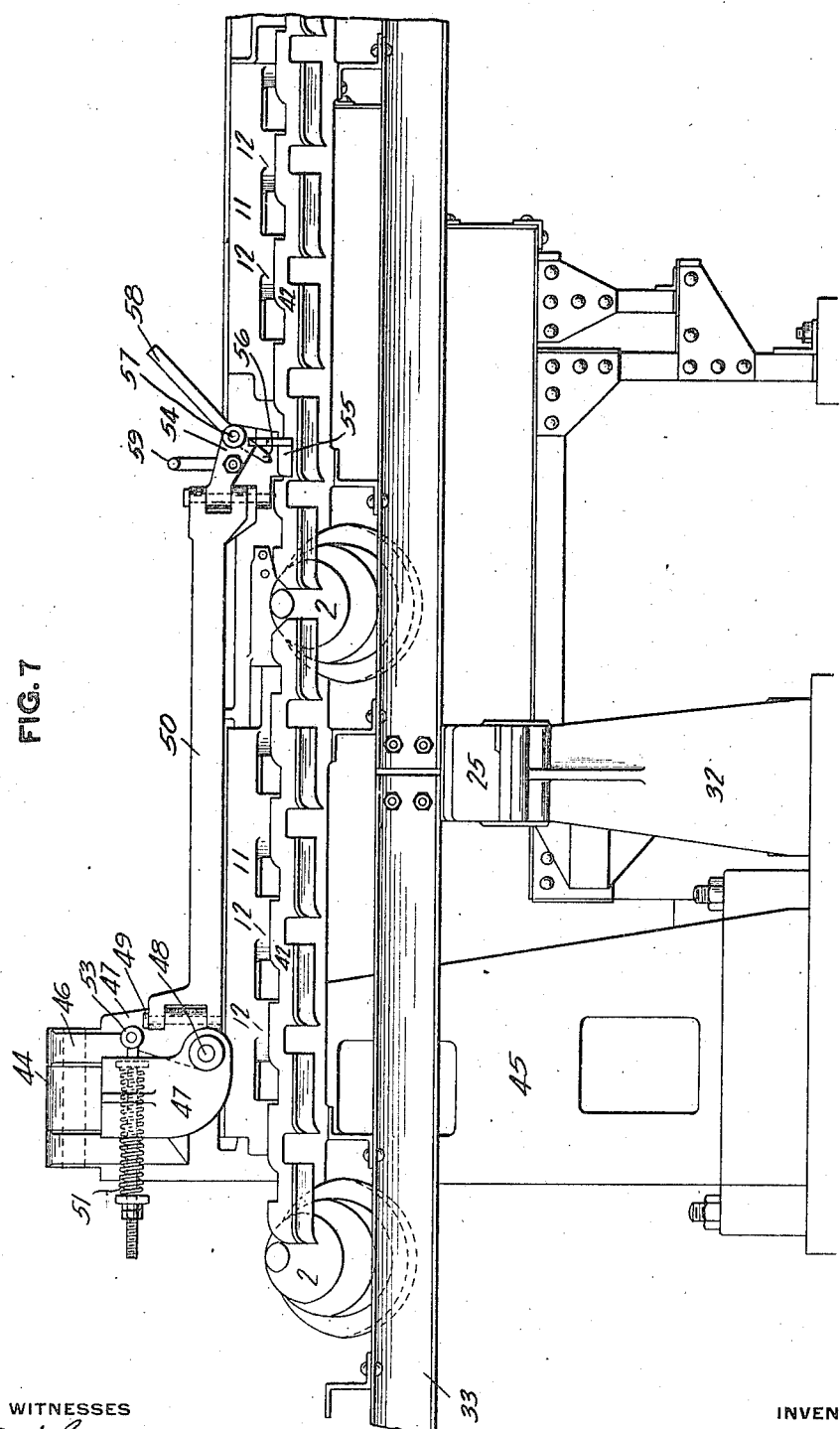

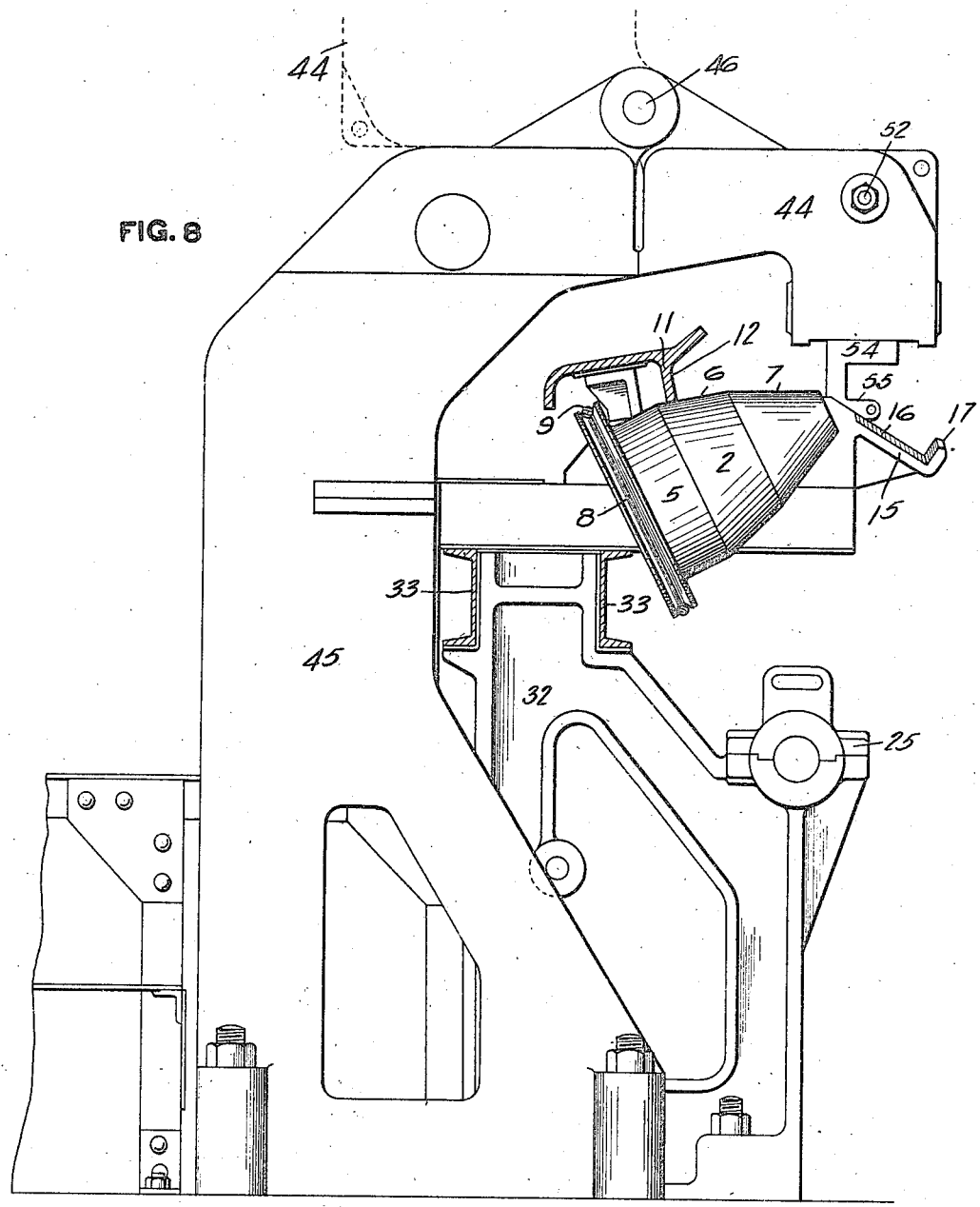

UNITED STATES PATENT OFFICE.

HOMER D. WILLIAMS AND WILLIAM AHLEN, OF DUQUESNE, PENNSYLVANIA.

BAR-HANDLING APPARATUS.

1,155,118. Specification of Letters Patent. Patented Sept. 28, 1915.

Application filed March 29, 1915. Serial No. 17,825.

*To all whom it may concern:*

Be it known that we, HOMER D. WILLIAMS and WILLIAM AHLEN, both residents of Duquesne, in the county of Allegheny and State of Pennsylvania, have invented certain new and useful Improvements in Bar-Handling Apparatus, of which the following is a specification.

Our invention relates to the construction and arrangement of apparatus used in handling and conveying rolled metal bars and similar materials made in rolling mills, and more particularly relates to the handling of such rolled materials while being cooled from the heated state in which they are finished in the rolling mill.

The bars and other materials rolled in modern merchant mills are of very great length compared with their transverse dimensions, billets up to 30 feet in length being reduced to bars and flats of 400 to 500 feet or more in length, and the rolling operation being effected very rapidly.

One object of our invention is to provide bar handling apparatus of novel construction having improved means whereby the successively rolled bars are handled as delivered from the rolls of the rolling mill and are transferred sidewise into position to be removed from the conveyer table forming part of our improved apparatus to a cooling or storage bed.

Another object of our invention is to provide bar handling apparatus having novel means whereby kinks or buckles in the thin, flexible bars are removed and the bars are straightened and maintained in a straight condition while being conveyed on the conveyer table rollers into position to be transferred to a hot bed on which the materials are stored and cooled.

Another object of our invention is to provide apparatus for handling rolled metal bars having novel means whereby the bars are transferred transversely of their length, or sidewise, from the run-out table forming part of our improved apparatus to the cooling or storage bed.

Another object of our invention is to provide novel means for transferring bars sidewise and enabling the forward end of a succeeding bar to enter upon the run-out table alongside the rear end of the preceding bar so that each bar is transferred sidewise to the cooling bed in the order rolled and without interference with the delivery of the succeeding bar and with a minimum gap or space between the bars.

A further object of this invention is to provide a kick-off mechanism having bar engaging fingers arranged to move a bar sidewise, while traveling lengthwise on the run-out table, out of the path of the succeeding bar, and thereby enable the front end of the succeeding bar to run alongside and overlap the rear end of the bar in engagement with the kick-off mechanism.

Still another object of our invention consists in the novel arrangement of the eccentrics for operating the transfer mechanism whereby the rear ends of the longitudinally moving bars are transferred sidewise from the rollers of the run-out table while the front or forward ends thereof are permitted to remain on the rollers for a longer time interval than the rear ends.

A further object of our invention is to provide bar handling apparatus having novel means whereby kinking and buckling of the heated bars is prevented.

A still further object of our invention is to provide a kick-off mechanism constructed and arranged to move, in the return stroke thereof, below the plane of the top of the run-out table rollers and avoid interference with the delivery lengthwise of a succeeding bar on the run-out table.

A still further object of our invention consists in the provision of the novel construction and arrangement of kick-off mechanism by which the bars are moved transversely from the rollers of the run-out table into position to be removed to a cooling bed or table.

A further object of our invention is to provide means for supporting and maintaining the bars in a straight condition after their removal from the run-out table rollers and until transferred to the cooling bed.

Figure 6:
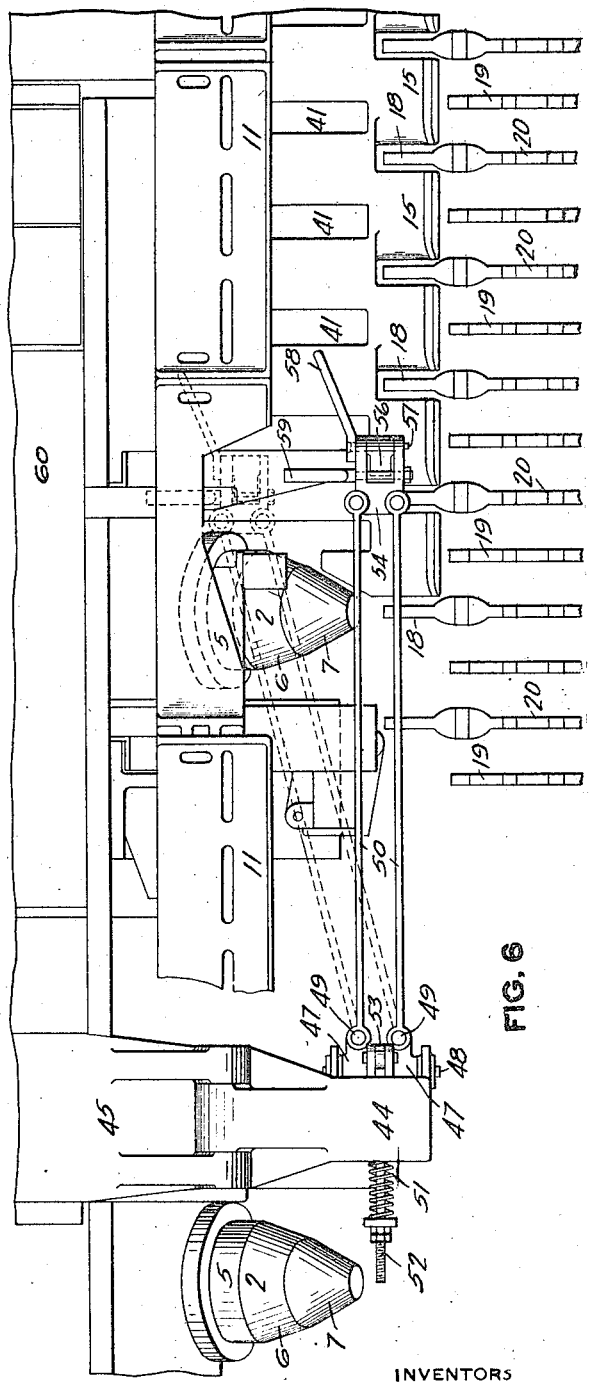

Referring now to the drawings forming part of this specification, Figure 1 is a plan showing a hot run-out table and the receiving side of a cooling bed or hot bed constructed and arranged in accordance with our invention and having novel means for preventing buckling, for straightening the rolled bars, and for transferring the bars sidewise from the run-out table to the cooling bed. Fig. 2 is a detail plan, on an enlarged scale, showing a typical section of the bar handling apparatus forming our invention. Fig. 3 is a sectional end elevation of the same, the section being taken on the line III—III of Fig. 1. Fig. 4 is a diagrammatic plan, showing the relative inclined position of the face of the side guard forming part of the run-out tables with respect to the feed rollers of the run-out table, as arranged in accordance with our invention. Fig. 5 is a sectional side elevation, the section being taken on the line V—V of Fig. 1, showing a detail of the connection between the sections of the kick-off by which the bars are transferred from the rollers to the inclined trough, from which the bars are later transferred to the cooling bed or hot bed. Fig. 6 is a plan showing details in the construction of the snapper by which the rear ends of the bars are transferred from the feed rollers of the run-out table to the inclined trough and by the use of which kinks or buckles in the bars are removed. Fig. 7 is a side elevation of the apparatus shown in Fig. 6. Fig. 8 is a sectional end elevation showing the position of the snapper mechanism and support therefor relative to the run-out table. Fig. 9 is a sectional end elevation showing the relative arrangement and location of the lifting bars of the hot bed with respect to the run-out table rollers and inclined support at one side of the run-out table, and showing the path of movement of the kick-off fingers and of the lifting ends of the lifting bars on the hot bed. Fig. 10 is an end elevation showing the relatively staggered position of the fingers of the kick-off and showing the eccentric arms by which the kick-off is operatively connected to the eccentric shaft. Fig. 11 is a sectional end elevation showing the relative arrangement of adjacent eccentrics in the series of eccentrics on the shaft for operating the kick-off fingers.

In the accompanying drawings, the numeral 2 designates the conical feed rollers, of which there is a series, forming the run-out table, each roller being arranged to rotate about an axis extending at an angle to the horizontal. These rollers 2 are mounted upon pins or shafts 3, and the pins or shafts are positioned at intervals in the length of the run-out table, (the pins 3 being rotatable with the rollers, as shown). The axes of these pins (and the rollers mounted thereon) are parallel, and the rollers 2, as shown, have cylindrical portions 5 and integral frusto-conical portions 6 and 7 on which the materials being handled are supported.

The cylindrical rear end 5 of each roller has a rope groove 8 therein with which the endless driving rope 9 engages at diametrically opposite points in rotating the rollers 2. The driving rope 9 extends lengthwise parallel with the length of the run-out table and the lower strand of the rope is carried on idler sheave wheels 10. One of the sheave wheels 10 is located closely adjacent to each conical feed roller 2 so as to hold the rope in frictional engagement with the lowermost side of the groove 8 in the rear end of the rollers 2

The rope 9 is driven at one end of the run-out table by a rope driving wheel or pulley which is driven by a variable and adjustable speed motor, the rope also passing over a tightening wheel connected to the mechanism, whereby the necessary tension is maintained on the rope 9 to hold the rope in operative engagement with the conical rollers 2. At the opposite end of the run-out table the rope is passed around suitably located sheave wheels. Such rope tightening and driving mechanisms being old and well known are not shown nor further described.

By reason of the inclination of the top surfaces of the frusto-conical portions 6 of the feed rollers 2, materials will move sidewise toward and into contact with the substantially vertical face 12 of the sectional side guard 11 while being conveyed lengthwise thereon As will be seen by reference to Figs. 3 and 4, the face 12 of this sectional side guard 11 is arranged so as to extend lengthwise at an angle to the lengthwise center of the run-out table formed by the rollers 2, with the rear end 13 of the sectional side guard somewhat closer to the large end of the feed rollers 2 than the front end 14 thereof. The arrangement of the side guard in this manner enables bars or similar materials being conveyed lengthwise to engage with a portion of the rotating surface of each succeeding feed roller 2 which is larger in diameter (and which therefore travels at a higher surface speed). This results in the successive rollers imparting a pulling or stretching effect to the thin, flexible and still heated bars as they are conveyed lengthwise by the run-out table rollers, so as to prevent sagging and kinking, and to straighten the lengthwise moving bars.

Extending outwardly from one side of the run-out table is a sectional apron or shelf 15 having an inclined plane surface 16 with an upwardly turned rib or flange 17 at the lower marginal edge thereof, the bars being transferred from the feed rollers 2 to this inclined apron or support by the fingers 40 of the kick-off mechanism and resting or remaining temporarily on the apron or support 15 until removed by the lifting ends 18 of the notched lifting bars 20 of the cooling bed or hot bed formed by the separately actuated, alternately lifting sets of lifting bars 19 and 20.

Below the run-out table formed by the series of conical rollers 2, and extending lengthwise parallel with the length of the run-out table, is an eccentric shaft 21 which is made up of a series of short shaft sections, each having an eccentric or crank 22 thereon, and longer shaft sections connecting the adjoining short sections. One end of each short shaft section is connected by a flange coupling 23 to the adjoining end of a long section, and the other end of each short section of the shaft is connected by means of an expansion coupling 24 to the adjoining end of a long section.

The expansion couplings 24 at intervals in the length of the sectional shaft make provision for the considerable amount of expansion and contraction to which the assembled eccentric shaft is subjected in the operation of our improved apparatus, as in some cases the run-out table will be 400 or more feet in length, and the parts are subjected from time to time to wide variations in temperature.

The sectional eccentric shaft 21 is rotatably mounted in a series of bearings 25, and located at an intermediate point in its length on each of the eccentrics 22 is a forked eccentric arm 26 having pairs of bosses 27 and 28 on the opposite ends thereof. The bosses 27 on the lower ends of the eccentric arms are connected by pins 29 to one end of counterweight levers 30, and the counterweight levers, at an intermediate point in their length, are pivotally connected by a pin or bolt 31 to the supporting stands 32 for the sides 33 of the run-out table.

A sectional counterweight 34 is adjustably mounted on one end of each lever 30 to counterbalance the kick-off fingers 40 and the angle supports 39 therefor, which supports are secured on the upper ends of the eccentric arms 26. Supplementary arms 36 having bosses 37 and 38 are secured on the pins 29 and 35 in the bosses on the ends of the eccentric arms 26.

Secured at one end on the upper ends of the eccentric arms 26 and at the other end to one of the supplementary arms 36, are horizontally extending angles 39, and fastened to these angles at short intervals in the length thereof are kick-off fingers 40. The fingers 40 project lengthwise upwardly and backwardly in the grooves or slots 41 provided in the cover plates 42 which are located between the conical feed rollers 2 of the run-out table, the arms 26 and 36 and angles 39 forming movable supports for the kickoff fingers 40.

Extending lengthwise parallel with the run-out table, at one side thereof, is the cooling table or hot bed which is formed of the sets of lifting bars 19 and 20, and which may be constructed and arranged as shown and described in our Patent No. 1,117,615 dated November 17, 1914, for a hot bed operating mechanism. This cooling bed comprises the series of notched lifting bars 19 and 20 which are arranged in two alternately lifting sets, one set having extensions 18 on one end thereof, which travel in the slots or grooves 43 in the inclined apron or bar support 15 forming part of our improved run-out table, and by means of which the bars or other rolled materials being handled are lifted from the inclined support 15 and are transferred to the notched bars 19 and 20 of the hot bed.

The kick-off fingers 40 are located with respect to the rollers 2 so that when the eccentric shaft 21 is actuated the upper ends of the fingers (as will be seen in Figs. 3 and 9) travel clockwise in an elliptical path which in the upward and forward movement of the fingers brings the ends thereof above the level of the uppermost surfaces of the conical feed rollers 2, and which in the downward and backward movement maintains the fingers below the level of the top surface of these rollers.

A large proportion of the bars handled by our improved apparatus, when such apparatus is used in connection with the modern merchant mill, will be very thin and therefore very flexible, particularly when in the highly heated state in which they ordinarily are while being moved lengthwise on the rollers 2 of the run-out table.

In order to gradually lessen the speed of the lengthwise moving bar, and at the same time absolutely prevent kinking of the bar, the short sections of the eccentric shaft 21 by which the fingers 40 of the kick-off are operated are arranged to extend each at an angle to the other, with the included angle between the center line of the eccentrics and a vertical line through the center of the shaft greater from the front toward the rear end of the run-out table (see Fig. 11). By arranging the supports in this manner the fingers on the support at the front end of the table will move first and the fingers then move successively toward the rear end of the run-out table, so that when the eccentric shaft is actuated to operate the kick-off mechanism the kick-off fingers 40 will first engage with the bar from the front or receiving end of the run-out table toward the rear end, and the last rolled end of the bar will be first moved transversely and will be moved into the inclined trough 15 on the discharge side of the run-out table before the front or first rolled end of the bars leaves the rollers 2. The rear ends of the successive bars, therefore, by reason of being moved onto gradually diminishing diameters of the conical rollers 2, and by reason of later dragging on the plane surface 16 of the inclined trough or support 15, will retard and gradually lessen the lengthwise movement of the bars on the run-out table, and thereby prevent buckling and kinking, and remove any buckles or kinks in the bars, when the bars are brought to rest in the inclined trough 15.

Positioned adjacent to the receiving or front end of the run-out table is a snapper mechanism of novel construction, by which the rear end of a bar is engaged and seized as the bar is traveling lengthwise on the feed rollers 2, this snapper mechanism being arranged so that while engaging a rolled bar it will swing sidewise and throw the rear end of the bar off the run-out table rollers 2 upon the inclined trough or support 15, and while the front end of the bar remains upon the feed rollers 2 the rear end thereof will be sliding on the plane surface 16 of the inclined trough 15.

When the run-out table is of considerable length or of a length of two or more times that of the materials rolled, a series of the snapper mechanisms will be provided at suitable intervals in the length of the run-out table, so as to enable the bars to be snapped from the run-out table at the necessary points in the length thereof, into position to be transferred to the desired portion of the hot bed or storage bed alongside the run-out table.

The swinging snapper mechanism, as will be seen in Figs. 6, 7, and 8, is supported above the run-out table, adjacent to the receiving end thereof, from the front end 44 of a pedestal or bracket 45. The front end 44 of this pedestal is hinged by a horizontal pivot pin 46 to the stationary portion 45 so that when desired the snapper mechanism may be turned or folded backwardly about the axis of the pin 46 so as to not extend above the run-out table rollers, as may be found desirable in handling some materials.

The knuckle 47, forming part of the snapper mechanism, is pivotally connected by a pin or shaft 48 to the hinged end 44 of the pedestal 45 so as to swing or rock vertically or about a horizontal axis to a limited extent, above the discharge side of the run-out table. Pivotally secured to this knuckle by axially vertical pins 49, 49, are lengthwise parallel snapper arms 50, 50, which are arranged to extend horizontally above the top surface of the conical feed rollers 2 of the run-out table. The knuckle 47 has a compression spring 51 adjustably secured on a spring rod 52 which yieldingly connects the arm 53 of the knuckle 47 to the overhanging end 44 of the pedestal 45.

The front ends of the arms 50, 50, have snappers 54 pivotally secured thereto, these snappers comprising U-shaped lower ends 55 with swinging dogs 56 pivoted on the snappers, the pivot shafts 57 for the dogs having manually operated levers 58 by which the dogs are moved into and out of engagement with the rear ends of bars moving forwardly on the run-out table.

A handle 59 is provided on the snappers by which the snappers and snapper bars are moved into and out of bar engaging position. It will be understood that the snapper mechanism which is used only with certain classes of materials, may be used or not, as is desired, and that the kickoff mechanism is used when the snapper mechanism is not used, and is also used at times when the class of material is such that the snapper mechanism does not completely remove a bar from the run out table to the trough.

A stationary platform 60 is secured on the channel beams forming the sides of the run-out table for the workmen who are stationed at suitable points in the length of the run-out table.

In the operation of our improved apparatus the conical rollers 2 are started in operation and the hot bed is placed in condition to be operated as required. A rolled bar is then delivered endwise from the rolling mill to the run-out table formed by the conical feed rollers 2. The rollers cause the bar to travel lengthwise thereon, and as the rear and largest ends of these feed rollers are in a plane somewhat lower than the plane of the smaller discharge ends thereof, the bar will be caused to hug the side guard 11 at the large end of the rollers. As the face 12 of this side guard is placed at an angle to the lengthwise center line of the feed bars of the run-out table the bars will be caused to travel on the successive rollers, upon portions thereof of increasingly greater diameter, and as with the apparatus shown the rollers are all driven at the same angular velocity, to travel upon positions of the successive feed rollers rotating at an increasingly greater surface speed, will cause the successive rollers 2 to exert a pull on the bar. The thin bars are extremely flexible when in the heated condition in which they are delivered to the run-out table, so they will be straightened by the action of the gradually increasing surface speed of the successive rollers and kinking or buckling will be prevented. When the rear end of each bar approaches the snapper, a workman on the platform 60 will grasp the handle 59 on the snapper and will hook the lower end 55 of the snapper around the lengthwise traveling bar. As the rear end of the traveling bar reaches the dog 56 on the snapper the workman will move the handle 58 to swing the dog into engagement with the lengthwise traveling rolled bar. The bar has considerable weight, and is traveling at a high velocity, so the lengthwise moving bar will exert a strong pull on the snapper and cause it to swing on the pivot pins 49, 49, so as to throw the rear end of the bar off the feed rollers 2 upon the inclined trough 15 on the discharge side of the run-out table feed rollers. The force necessary to bring the lengthwise traveling bar to rest also will remove any kinks or buckles in the bar. At the time the snapper bar is actuated the eccentric shaft 21 is started so as to cause the kick-off fingers 40 to lift and move toward the discharge side of the run-out table, and as the fingers are successively brought into engagement with the bar, or such portions as have remained on the feed rollers 2, the bar is moved transversely until it rests entirely upon the inclined trough 15. The cooling table is then started in operation and the lifting ends 18 of the lifting bars 20 will raise the rolled bar now supported on the inclined trough and transfer this bar to the first set of notches in the series of notched bars 20 forming part of the cooling bed.

When, as will be the case with some classes of rolled materials, it is not desired to use the snapper, it will remain stationary and will not be caused to engage with the rear end of each successive bar. In such cases the kick-off fingers 40 alone will serve to move the rolled materials sidewise from the rollers 2 into the inclined trough 15.

With other classes of materials the action of the snapper bar will be sufficient to throw the bars transversely from the rollers into the inclined trough so as to make the use of the fingers 40 unnecessary. Ordinarily, however, the fingers will be used in conjunction with the snapper in moving the rolled bars sidewise from the run-out table to the inclined trough into position to be lifted therefrom and transferred to the cooling bed.

The various motors used in actuating our improved apparatus may be started and stopped manually, or as is preferable, these starting and stopping operations may be effected mechanically, so as to start and stop in predetermined sequence.

The advantages of our invention will be apparent to those skilled in the art. The apparatus is simple and is easily kept in repair. By its use the rolled bars or other materials are successively transferred from the rolling mill to the cooling bed with a minimum amount of labor. In conveying the bars to the cooling bed they are automatically straightened and kinks or buckles in the materials are prevented and avoided. The rear end of each bar is moved from the run-out table so as to avoid delay in the delivery of the next succeeding bar.

Modifications in the construction and arrangement of the parts may be made without departing from our invention as defined in the appended claims. Instead of arranging the eccentrics and fingers of the kick-off mechanism with the fingers in the relatively staggered positions shown, the fingers may be positioned in a plane parallel with the lengthwise center of the run-out table, this arrangement being desirable in rolling bars of heavy cross section.

We claim:—

1. Apparatus for handling metal bars comprising a series of rollers forming a run-out table, a support alongside said run-out table to which the bars are transferred from the run-out table, and means for moving the bars sidewise from the run-out table to said support, said means being arranged to engage and move the rear ends of the bars in advance of the front ends thereof.

2. Apparatus for handling metal bars comprising a series of rollers forming a run-out table, a support alongside said run-out table to which the bars are transferred from the run-out table, means for moving the bars sidewise from the run-out table to said support, said means being arranged to engage and move the rear ends of the bars in advance of the front ends thereof, a hot bed alongside said support, and means for lifting the bars from the support to said hot bed.

3. Apparatus for handling metal bars comprising a series of rollers forming a run-out table, a support on one side thereof to which the bars are transferred from the run-out table, and means for moving the bars sidewise from the run-out table to the said support, said means comprising fingers engaging with the bars, horizontal supports for the fingers, eccentric arms for said supports, an eccentric shaft having eccentrics on which said eccentric arms are mounted, and means for rotating said eccentric shaft.

4. Apparatus for handling metal bars comprising a series of rollers forming a run-out table, a support on one side thereof to which the bars are transferred from the run-out table, and means for moving the bars sidewise from the run-out table to said support, said means having fingers at intervals in the length thereof adapted to engage the bars in the sidewise movement thereof and arranged to engage and move the rear ends of the bars in advance of the front ends thereof, and means for actuating said bar moving means.

5. Apparatus for handling metal bars comprising a series of rollers forming a run-out table, a support on one side thereof to which the bars are transferred from the run-out table, means for moving the bars sidewise from the run-out table to said support, said means comprisng fingers engaging with the bars, horizontal supports on which the fingers are secured, eccentric arms for said supports, an eccentric shaft having eccentrics on which said eccentric arms are mounted and means for rotating said shaft, and a hot bed at one side of the run-out table to receive the bars removed therefrom, said hot bed having means for lifting bars from said support.

6. Apparatus for handling metal bars comprising a series of rollers forming a run-out table, a support on one side of said run-out table to which the bars are transferred from the run-out table, means for moving the bars sidewise from the run-out table to said support, said means being arranged to engage and move the rear ends of the bars in advance of the front ends thereof, means for actuating said bar moving means, and a hot bed at one side of the run-out table to receive the bars removed therefrom, said hot bed having means for lifting the bars from said support to the hot bed.

7. Apparatus for handling rolled metal bars comprising a series of conical rollers, the small ends of said rollers being elevated to bring the axes thereof at an angle to the horizontal, a side guard at the large ends of said rollers, said side guard extending lengthwise at an angle to the line of feed of bars traveling on said rollers to bring the bars upon portions of the conical rollers of successively increasing diameter and thereby straightening and preventing buckling of the bars while traveling longitudinally on the rollers of said run-out table, and means for removing the bars sidewise from said rollers.

8. Apparatus for handling rolled metal bars comprising a series of conical rollers, the small ends of said rollers being elevated to bring the axes thereof at an angle to the horizontal, means for removing the bars sidewise from said rollers and a side guard at the large ends of said rollers, said side guard extending lengthwise at an angle to the line of feed of the bars traveling on said rollers and forming means for causing the lengthwise moving bars to engage successively portions of increasingly greater diameter on the conical rollers to thereby pull the metal and prevent buckling thereof when being transferred lengthwise on said run-out table rollers.

9. Apparatus for handling metal bars comprising a series of rollers forming a run-out table, an inclined support alongside the run-out table to which the bars are transferred sidewise from said run-out table, a swinging snapper mechanism above the run-out table for transferring the bars to said support, means on the swinging end of said snapper mechanism for engaging the ends of bars traveling lengthwise on said run-out table in transferring the bars to said support, and manually operated means for causing engagement of said bar-engaging means with the bars to thereby attach the snapper mechanism to the rear end of the bars on the run-out table and move the bars sidewise from the run-out table.

10. Apparatus for handling metal bars comprising a series of rollers forming a run-out table, an inclined support alongside the run-out table to which the bars are transferred sidewise from said run-out table, a swinging snapper mechanism above the run-out table for transferring the bars to said support, means on the swinging end of said snapper mechanism for engaging the ends of bars traveling lengthwise on said run-out table in transferring the bars to said support, said means having a pivoted dog thereon, and a manually operated handle for moving the dog into engagement with bars moving lengthwise on the run-out table.

11. Apparatus for handling metal bars comprising a series of rollers forming a run-out table, an inclined support alongside the run-out table to which the bars are transferred sidewise from said run-out table, a swinging snapper mechanism above the run-out table for transferring the bars to said support, said means having a hooked arm thereon arranged to embrace bars supported on said run-out table, a manually operated swinging dog to engage the arm, and manually operated means connected to the dog for moving the dog into bar engaging position.

12. Apparatus for handling metal bars comprising a series of rollers forming a run-out table, and means for moving the bars sidewise from the run-out table, said means being arranged to engage and move the rear ends of the bars in advance of the front ends thereof.

13. Apparatus for handling metal bars comprising a series of rollers forming a run-out table, and means for moving the bars sidewise from the run-out table, said means comprising fingers engaging with said bars, horiozntal supports for said fingers, eccentric arms for said supports, an eccentric shaft having eccentrics on which the eccentric arms are mounted, and means for actuating the eccentric shaft.

14. Apparatus for handling metal bars comprising a series of rollers forming a run-out table, and means for moving the bars sidewise from run-out table, said means having fingers at intervals in the length thereof, and said fingers being arranged to engage and move the rear ends in advance of the front ends of the bars, and means for actuating said bar moving means.

In testimony whereof, we have hereunto set our hands.

HOMER D. WILLIAMS.
WILLIAM AHLEN.

Witnesses:
H. G. SAYLOR,
T. E. McDOWELL.

Copies of this patent may be obtained for five cents each, by addressing the "Commissioner of Patents, Washington, D. C."